United States Patent [19]

Maier et al.

[11] Patent Number: 4,677,750

[45] Date of Patent: Jul. 7, 1987

[54] GUIDE ARRANGEMENT FOR A PORTABLE POWER SAW

[76] Inventors: Peter Maier, Gerokstrasse 1, D-7311 Neidlingen; Gernot Hänsel, Gerstenstrasse 31, D-7000 Stuttgart 70, both of Fed. Rep. of Germany

[21] Appl. No.: 670,336

[22] Filed: Nov. 9, 1984

[30] Foreign Application Priority Data

Nov. 12, 1983 [DE] Fed. Rep. of Germany ....... 3341003

[51] Int. Cl.$^4$ .............................................. B23D 47/02
[52] U.S. Cl. .......................................... 30/376; 83/743
[58] Field of Search ................. 30/388, 390, 394, 286, 30/296, 297, 376; 83/743, 745, 478, 662, 859, 860

[56] References Cited

U.S. PATENT DOCUMENTS

| | | |
|---|---|---|
| 2,630,147 | 3/1953 | Garberg . |
| 3,298,407 | 1/1967 | Scott . |
| 3,586,077 | 6/1971 | Pease ..................................... 30/376 |
| 3,695,316 | 10/1972 | Pluckham ........................ 83/743 X |
| 3,915,045 | 10/1975 | Kitzman ................. 83/745 |
| 4,125,942 | 11/1978 | Horner et al. . |
| 4,244,118 | 1/1981 | Matuzak ........................... 83/745 X |
| 4,307,513 | 12/1981 | Genge ................. 83/745 X |

FOREIGN PATENT DOCUMENTS 3341003 1/1986 Fed. Rep. of Germany .
783112 9/1957 United Kingdom .

Primary Examiner—E. R. Kazenske
Assistant Examiner—W. Fridie
Attorney, Agent, or Firm—McGlew and Tuttle

[57] ABSTRACT

A guide arrangement for portable power saws is made up of a guide plate adapted to be placed on the work and a stand plate fixed to the saw. The guide plate possesses a raised rail running in the feed direction of the saw. In use, the saw with the stand plate is placed on the guide plate so that a socket in the stand plate fits round the rail and the stand plate may then be moved along the guide plate on the rail, the guiding section straddeling the rail and guiding the stand plate on the rail. The stand plate is fitted with a backlash limiter having an operating part acting against the side of the rail for reducing play between the rail and the stand plate. This means that the saw is guided in the length direction parallel to the rail of the guide plate and it is possible for straight cuts to be sawn with a high degree of accuracy without any danger of the saw running askew.

The backlash limiter may take the form of a spring loaded member or one driven by a screw or threaded rod. Alternatively the member may have a slot to allow adjustment thereof in relation to the rail.

7 Claims, 8 Drawing Figures

GUIDE ARRANGEMENT FOR A PORTABLE POWER SAW

BACKGROUND OF THE INVENTION

The present invention relates to guide arrangements for portable power saws and made up of a guide plate adapted to be placed on the work and a stand plate fixed to the saw. The guide plate possesses a raised rail running in the feed direction of the saw. In use, the saw with the stand plate is placed on the guide plate so that the stand plate fits round the rail and the stand plate may then be moved along the guide plate on the rail, the guiding section straddling the rail and guiding the stand plate on the rail. This means that the saw is guided in the length direction parallel to the rail of the guide plate and it is possible for straight cuts to be sawn with a high degree of accuracy without any danger of the saw running askew.

A guide arrangement as designed on these lines may for example have a piece of metal section functioning as the rail and the stand plate may be designed to mate therewith so that there is positive engagement between the stand plate and the rail. The cross section of the rail may more specially be generally rectangular so that it may take the form of a square section pipe produced by extrusion. In this case, the stand plate will have a matching socket into which the rail fits. To take one example, the stand plate may be fitted with two sliding shoes mounted on the rail like a straddling saddle having the opposite form thereto. Furthermore, it is possible for the stand plate to be stamped so as to have a guiding means in the form of a pressed lip, and in a more specially simple design the guide means on the guide plate takes the form of a slot, whose upwardly bent edges rest against the rail.

With the rail and the saddle or runner designed to fit on the stand plate there are necessarily some inaccuracies in manufacture. In order to take care of such inaccuracies a relatively large play is left between the stand plate and the rail in known designs. In the case of a rail in the form of an extruded section, the inaccuracies due to manufacture are in a range of ±0.15 mm and a stand plate formed by bending is likely to be subject to even greater inaccuracies so that ultimately the amount of play in the guide will be anything up to 0.4 mm. However, such a large amount of play has a serious effect on the accuracy of cutting with the saw. Although it is naturally possible in principle to produce guide means with a more accurate guiding effect by machining the parts, then the extra expense and work involved are hard to justify economically.

SHORT OVERVIEW OF THE PRESENT INVENTION

One aim of the present invention is to design a guide arrangement for a portable power saw which on the one hand is simple and economic to produce, while at the same time giving a very much more accurate guiding action.

For effecting this and other objects of the invention that will appear in the course of the present account, a guide device for a portable saw consisting of a guide plate adapted to be laid on the work and which bears a raised rail alined with the feed direction of the saw, and of a stand plate fixed to the guide plate, which is adapted to be mounted on the guide plate and is able to be moved along the rail, the stand plate being supported on the rail by way of two guide members straddling the rail, is characterized by a backlash limiter acting between the stand plate and the guide plate to take up the running play between the rail and the guide members.

This design forming part of the present invention makes it possible on the one hand to use manufacturing techniques both for the guide plate and also for the stand plate (which are likely to have a certain degree of inaccuracy), such techniques not involving complex finishing operations on the parts produced. In particular, the rail may be in the form of tubing or an extruded section, and the complementary form of the guiding structure on the stand plate may be produced by embossing, bending or stamping. A certain amount of play as occasioned by the process of manufacture between the guide plate and the stand plate is tolerated and a backlash limiter is placed either on the guide plate or on the stand plate, such backlash limiter enabling later adjustment to take up the play and to adapt to any particular tolerances in the product as a whole. If, to take an example, only a relatively low accuracy in the saw cut is called for, the guide play may be increased so that the stand plate may be moved over the guide plate with less effort. On the other hand, for high-precision cutting the guide play may be reduced and then there will be much more friction opposing the motion of the saw and the user will have to use more force. The backlash limiter of the invention further makes possible re-adjustment of the guide system to allow for wear; furthermore the backlash limiter may have an automatic adjusting effect.

A detailed account of the invention will now be given on the basis of the four working examples to be seen in the figures, which are in part diagrammatic. Also, some further features of the invention will be seen from the claims.

LIST OF THE SEVERAL VIEWS OF THE DRAWINGS

DETAILED ACCOUNT OF WORKING EXAMPLES OF THE INVENTION

Figure 1:
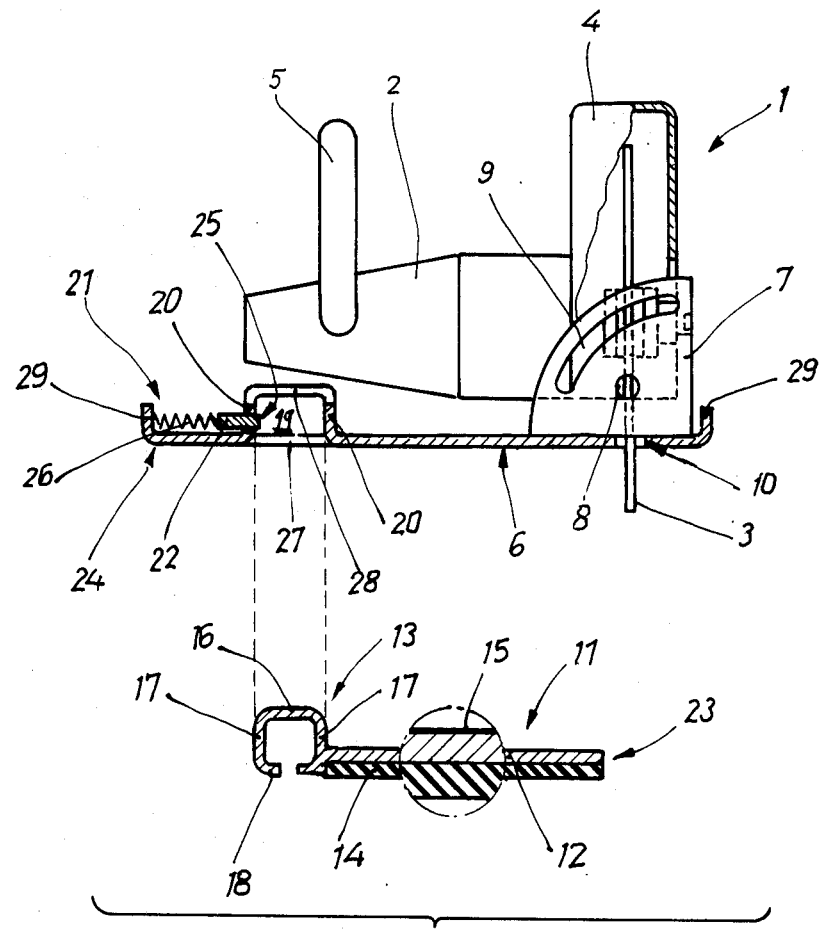
FIG. 1 is a longitudinal exploded section through a saw equipped with a guide system of the invention, the stand plate being shown lifted clear of the guide plate, looking in the direction of saw feed.

Referring firstly to FIG. 1 herein, the reader will see a power driven circular saw 1 shown only by way of example, and which is fitted with the guide arrangement of the invention. However, it is to be understood that the invention is not in fact limited to circular saws and the guide arrangement may find application to portable power saws in general. The circular saw in the present case possesses a motor housing 2. in which an electric motor—not described here in detail—is accommodated. The output shaft of the motor bears a saw blade 3, that has the greater part of its circumference in a blade cover 4. A handle 5 is molded or otherwise formed on the motor housing 2 so that the saw user may hold it.

A stand plate 6 is fixed to the circular saw 1 under the motor housing 2 to form a foot for the saw 1. The connection between the circular saw 1 and the stand plate 6 is in the present example of the invention formed by an upright rocking segment 7. The same rocks about a level pivot pin 8 about which a part-circular slot 9 is centered. The circular saw 1 is able to be rocked about the pivot pin 8 and has a bolt or pin running through the slot 9 and which may be used to lock the saw in certain angular settings in relation to the stand plate 6. There is furthermore a scale, not illustrated, so that the user may get a reading for the angle set. The saw blade 3 extends through a slot 10 in the stand plate 6 to be proud of the lower side of the stand plate 6 facing away from the motor housing 2. The amount of such extension, i.e. the degree to which the blade is proud of the said face, determines the depth of cut of the circular saw when it is pushed with the stand plate 6 over a piece of work to be sawn up.

To guide the circular saw 1 on the work, use is made of a guide plate 11, that the user places on the work with sufficient friction to prevent slipping. To this end the guide plate 11 has a flat apron section 12 and a proud rail 13 joined thereto. On the lower side of the apron section 12 it is in engagement with the work, and the topside of the apron section 12 and the rail 13 then form a sliding arrangement for the stand plate 6. The two opposite faces of the apron section have different functions and for this reason have to have different properties. For this reason it is made of different materials that are laminated together.

The guide plate 11 is in the present working example made in the form of a metal section. The apron section 12 and the rail 13 are for this reason integral with each other. Such a construction is particularly simple and economic to produce, without however its being a mandatory feature of the invention herein. It would in fact be possible for the apron section 12 to be made separately, for example from sheet metal and riveted or welded to a separately manufactured rail although this is not illustrated. The apron section 12 of the guide plate 11 has a coating 14 on its lower side nearest the work, such coating being made of a material with a high degree of friction and good anti-slip properties. More specially, the coating 14 may be made of an elastically compressible material such as rubber or of a sponge material. Such material is cut out in the form of a mat 12 that is then fixed, preferably by adhesive, to the apron section 12, to which it corresponds in size. This coating 14 means that the guide plate 11, once placed on the work, will keep in place thereon when the saw is being used without clamps or the like being needed. The top side of the guide plate 11 facing the stand plate 6 bears a thin layer 15 of a smooth, hard plastic material with a low coefficient of friction. A layer of the same material is present on the rail 13 as well. This makes possible a low friction or self-lubricating guiding of the stand plate 6 on the guide plate 11.

The rail 13 is in the form of a downwardly opening hollow section with a generally rectangular cross section. The edges of the hollow section are rounded or filleted and the back 16 of the section is proud of the apron section 12. The rail 13 is placed at the side edge of the apron section 12. The latter is joined in some way with one of the webs 17 of the hollow section so as to be at a different level to the slotted bottom flange 18, that is opposite to and underneath the back 16 of the section. This difference in level is sized to be somewhat larger than the thickness of the anti-slip coating 14 on the lower face of the apron section 12. The guide plate 11 is for this reason only supported on the work by way of the coating 14, and the rail 13 itself is spaced somewhat from the face of the work.

A guide plate 11 of the type described may for example be manufactured in the form of an aluminum extrusion. The cross section of the rail 13 in this respect does not necessarily have to be rectangular; for example, it would be possible to have a cross section in the form of a dove-tail or a trapezoid. Another point is that the guide plate 11 may be made from sheet metal and the rail 13 in the form of an embossed or bent lip or raised portion thereof.

The circular saw 1 is placed so that the stand plate 6 is on the guide plate 11, straddling the rail 13. The stand plate 6 has a socket 19 that is the same in form as the rail 13 so that the rail fits into it. It is by way of this socket 19 that the stand plate 6 is positively kept in place on the guide plate 11 so that there is a linear guiding function in the direction of feed of the saw. The stand plate 6 may, like the guide plate 11, be made of section. In the present example, however, the stand plate 6 constitutes the base plate of the circular saw 1 and the plate is preferably made of sheet metal. The socket 19 is in the form of an elongated slot produced by stamping, with its edge in the form of two lugs 20 bent up vertically out of the plane of the plate. The two lugs 20 are located on the side of the stand plate 6 opposite to the workpiece, i.e. facing away from it, and they run exactly parallel to each other with a space between them that is a little greater than the breadth of the rail 13. The stand plate 6 may for this reason be mounted on the rail 13 of the guide plate 11, and this play is limited in keeping with the invention by a backlash limiter 21 taking effect between the stand plate 6 and the guide plate 11, such backlash limiter being diagrammatically illustrated in FIG. 1.

The said backlash limiter 21 is placed in a part of the stant plate 6 that runs out further to the left than the guide plate 11. When it is mounted in place the stand plate 6 overlaps in an outward direction on both sides of the guide plate 11, this meaning more specially that the saw blade 3 takes up a position past the edge 23, furthest from the rail 13, of the guide plate 11. The saw blade 3 will be able to reach the work in all possible angular settings of the circular saw 1 without the guide plate 11 being in its way.

On the other, left-hand side of the guide plate 11 a section of the stand plate 6 projects up and supports the backlash limiter as just noted. The backlash limiter 21 has an operative part 22, that is mounted so that it may be moved in a direction normal to the length direction of the rail 13. The operative part 22 runs through a slot or gap in one of the lugs 20 and into the space inbetween, that in the assembled condition has the rail 13 fitted into it. A part 25 of the operative part 22 acts on the rail 13, such part 25 more specially being rounded, it so limiting the transverse play of the rail 13 between the lugs 20. As will be made clear in what follows, it is possible for different sorts of adjustment to be effected for the operative part 22. Among other things a rigid precision setting is possible. But however it is possible for the operative part 22 to be loaded resiliently into engagement with the rail 13. In FIG. 1 there is a compression spring 26 for this purpose, that acts on the operative part 22.

The socket 19 and the lugs stretch along generally the full length of the stand plate 6 so that they are only cross pieces 27 left at their ends. To make the construction stronger, it is possible to have bridges 28 spread out along the length of the socket 19, such bridges joining the lugs 20 together. The bridges 28 span the socket from one side thereof to the other like arches. It is quite possible for them to take the place of the bridges 27 at the edge of the stand plate as well so that the socket 19 runs right the way along the full length of the stand plate without any interruption. This design is better inasfar as displacement on the guide plate 11 is possible without encountering an end stop.

The edge sections 29 running in the direction of sawing on the stand plate are bent upwards through about 90° out of the plate of the plate. These may also function for guiding the saw.

Figure 3:
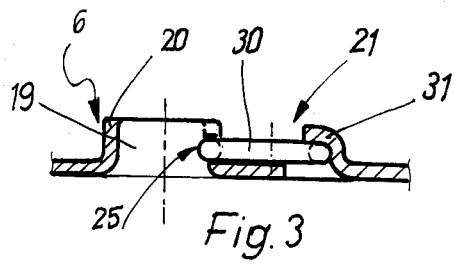
FIG. 3 is a section taken on the line III—III of FIG. 2 through the backlash limiter.
Figure 2:
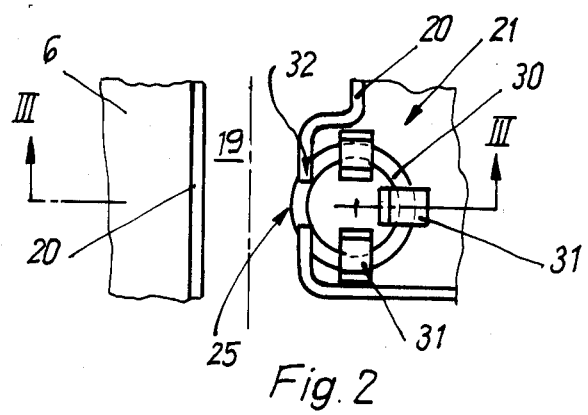
FIG. 2 is a plan view of a first working example of the backlash limiter.

Referring now to FIGS. 2 and 3, the reader will be able to see a first working example of the backlash limiter of the invention, that limits the amount of play between the stand plate 6 and the guide plate 11. The backlash limiter is placed on the stand plate 6. It will be seen from the figure that on the two sides of the socket 19, into which the rail 13 fits, there are sections of the stand plate. The socket 19 is limited or defined by the edge lugs 20 of the stand plate 6, that are bent through an angle of about 90° in relation to the plane of the plate. The Edge lug to be seen in FIGS. 2 and 3 on the left runs generally straight and parallel to the direction of feed of the saw. The opposite edge lug 20 is on the other hand angled or bent to form a narrower part of the socket 19 and the backlash limiter 21 is mounted at this position.

The backlash limiter 21 has a ring 30 that is made of a springy material, more specially spring steel, although it furthermore might be made of resin. The ring 30 is fixed flat on the stand plate 6, the plane of the ring being parallel to the plane of the plate. It is fixed in place by lugs 31, that are more specially formed by embossing or stamping the stand plate 6 and bending in an upward direction so as to overlap the circumference of the ring 30. They are distributed out round its center point. In particular it is possible to have three lugs 31 with a spacing of about 90° therebetween. The ring 30 is placed between the lugs 31 and the floor of the stand plate with some elastic deformation. It takes up a position against the upwardly bent edge lug 20 and is kept in position resiliently. The edge lug 20 has a slot or gap 32, through which the ring 30 protrudes. The ring 30 so fits in the gap 32 that it runs out past the outer side, facing the rail 12, of the lug 20 and comes to rest against the rail 13, when the stand plate 6 is mounted on the rail 13 that fits into the socket 19. The ring 30 rests against the side edges of the edge lug 20, that define the gap 32 between them. The lugs 31 are on the left side of the ring 30 that is turned away from the gap 32. They make possible deformation of the ring 30, same then moving back out of the way into the gap 32 and the rail 13 is acted upon by the ring because of the elasticity. The ring 30 is preferably made of round stock. For this reason the part protruding through the gap 32 and engaging the rail 13, has a rounded outline that makes it easier to put the stand plate 6 in place on the guide plate 11.

It is preferred for there to be several backlash limiters 21 on the stand plate 6 distributed along its length. It is more specially preferred to have an arrangement with two backlash limiters so that two spaced ring 30 engage the rail 13 and act upon it at two separate points. The backlash limiters 21 are preferably placed at the two ends of the socket 19, that is to say near the edge part of the stand plate 6 so that the points of purchase are as far apart as possible.

Figure 5:
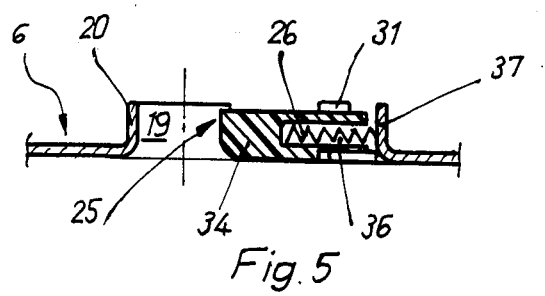
FIG. 5 is a section taken through the backlash limiter on the line V—V of FIG. 4.
Figures 4, 6:
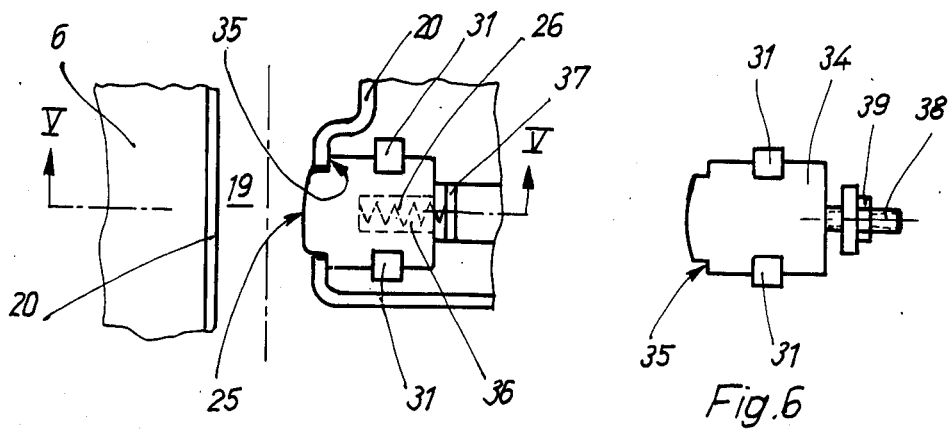
FIG. 4 is a plan view of a second possible form of the backlash limiter of the instant invention.
FIG. 6 is a plan view of a third embodiment of the backlash limiter of the present invention.

Referring now to FIGS. 4 and 5, the reader will be able to see an alternative construction of the backlash limiter 21. The form of the stand plate has been generally left unchanged and it will be seen that again there is the socket 19 into which the rail 13 is fitted, the edge lugs 20 forming the limits of the socket 19. One of the edge lugs 20 is angled or bent round so as to form a narrow part or mouth to the socket 19 and is slotted at this point. There is a sliding shoe 34 mounted in the slot and it is for example made of synthetic resin. The shoe 34 is able to be moved in a direction running across the length direction of the rail 13. It has a jaw 25 of reduced thickness protruding through the slot 33, such jaw best being placed so that it acts on the rail at about half its height, that is to say against the side thereof. The jaw 25 is preferably rounded like the head of a rivet, that is to say rounded not only in the length direction of the rail 13 but also in the height direction thereof. The jaw 25 merges with a shoulder 35 in the broader part of the shoe 34. The latter has its shoulder 35 resting against the edge of the slot 33 and this abutment or engagement limits the amount by which the jaw 25 protrudes past the side, turned towards the rail 13, of the edge lug 20.

The sliding shoe 34 is held in place on the stand plate 6 by way of the lugs 31. The lugs may be produced on the stand plate 6 by stamping or embossing. They are made opposite to each other on the side edge of the sliding shoe 34 and overlap it like claws, the necessary play for motion to take place allowing shifting of the shoe 34 in a direction normal to the direction of the length of the rail. The shoe 34 is loaded by a compression spring 26, urging it towards the rail 13. The compression spring 26 for example may be in the form of a helical compression spring, although a leaf or strip spring would be possible as well. A particularly simple design is one in which a spiral compression spring 26 is housed in a blind hole 36 in the shoe 34. The spiral compression spring 26 then has its one end resting against the floor of this hole 36 and its other end will act on the stand plate 6 as a suitable counter abutment. It is more specially possible for a further embossed lug 37 to be present on the stand plate 6 opposite to the slot 33, it being close to the back of the shoe 34. This lug 37 may at the same time limit the stroke of the shoe 34 in a direction away from the rail 13.

In all the forms of the invention so far described the operative part 22 of the backlash limiter 21 is resiliently in contact with the rail 13 or is kept resiliently in engagement therewith. This design has the useful effect that it automatically takes up play to compensate for inaccuracies in manufacture or wear. By the right choice of the material, the spring force may be varied by the designer within wide limits and furthermore the spring force may be made adjustable. This makes it possible to minimize the play between the stand plate 6 and the guide plate 11 while at the same time keeping down the friction force that has to be overcome on the rail guide. In place of a resilient engagement of the operative part 22 it is however possible for it to be rigidly, i.e. non-resiliently, adjustable. Referring to FIG. 6 it will be possible to see such a shoe 34, that in its design and placement is generally like that of FIG. 4. It is supported so that it may be moved along in lugs 31 normally to the lengthways directions of the rail and it engages the rail 13 with a jaw 25, that protrudes through a slot or gap 33 in the edge lug 20 limiting the socket 19. The adjustment of the shoe 34 is by way of a screw or screw threaded rod. As for details it will be seen that there is a grub screw 38 fitting in a threaded hole in the shoe 34. The grub screw 38 is mounted on the stand plate 6 so that it is not able to be moved in the length direction although it may be turned. The lugs 31 ensure a lengthways guiding action for the shoe 34 without the chance of any turning. By turning the grub screw 38 the shoe 34 is therefore moved towards or away from the rail 13. The adjustment of the shoe 34 is undertaking in keeping with the desired play between the stand plate 6 and the guide plate 11 and set by tightening a lock nut 39 on the grub screw 3.

Figure 8:
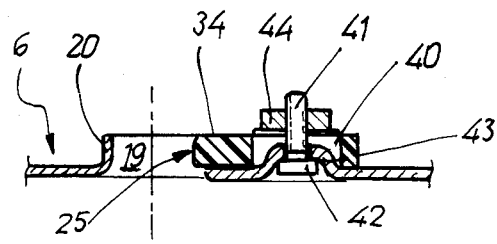
FIG. 8 shows a section taken through the backlash limiter on the line VIII—VIII of FIG. 7.
Figure 7:
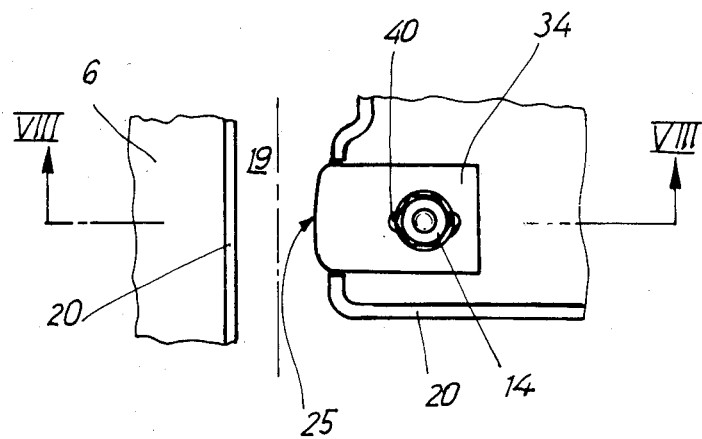
FIG. 7 is a plan view of a fourth working example of the present invention.

Turning now to FIGS. 7 and 8 the reader will be able to see a further example for a way of finely adjusting a sliding shoe 34. In this case the shoe 34 is in the form of a flat molding of synthetic resin with a generally rectangular outline or plan. The shoe has a domed jaw part 25 protruding through a slot or gap 33 into the path of the rail 13 and may be adjusted in slot guide in a direction normal to the length direction of the rail. As may be more specially seen from FIGS. 8, the shoe 34 has a slot 40 machined in it. The stand plate keeps a screw 41 in place that in the assembled condition runs through the slot 40. In this respect the screw 41 has its head 42 taken up in an embossed dent 34 in the stand plate 6 so that it is countersunk to be under the surface of the stand plate 6. In this respect the dent 43 may so match the outline of the screw head 42 that the same is locked against rotation in the dent 34. The dent 34 is furthermore such as to fit in the slot 40 of the shoe 34 so that the play of the shoe 34 is limited. A shoulder 35 on the shoe 34, as used in FIGS. 4 and 6 as a way of limiting motion by acting as a stop, is not absolutely necessary in the design of FIG. 7, because the dent 43 has the same function. The shank of the screw 41 runs through the slot 40 and it protrudes past the surface of the shoe 34. A nut is screwed onto this end of the screw 41, such nut preferably having a washer for acting on the shoe 34 and arresting it in selectable positions.

As will hardly need any explanation, it is possible to have more than one and more specially two backlash limiters 21 spread out along the length of the socket 19 in which the rail 13 is guided. Furthermore the respective operative parts 22 all act on the side wall of the rail 13 about half way up it. In the working examples of the invention here illustrated the backlash limiter 21 is each time placed on the stand plate. However another design would be conceivable in which one or more units of the backlash limiter 21 would be mounted on the guide plate 11 for engagement with the rail 13 and they would have the jaw parts acting on a suitable guide section of the stand plate 6. Different forms of the backlash limiter 21 may be combined with each other and more particularly it is possible in this connection to have partly a rigid engagement of the operative part 22 with the rail 13 and partly a resilient one. The backlash limiter may act at one or more points between the stand plate 6 and the guide plate 11; however it would furthermore be possible for it to comprise an operative part running along the full or part of the length of the guide plate or the stand plate. In the case of a resin design of the operative part the sliding face opposite to the operative part is preferably one of resin as well. This means that there is no metal-to-metal engagement and there are particularly smooth running properties.

What is claimed is:

1. A guide structure for a portable power saw comprising a guide plate adapted to be laid on a piece of work to be sawed with said saw, a proud rail forming part of said guide plate and running in a feed direction of said saw, a stand plate mounted on said saw, said stand plate being adapted to fit onto said guide plate and being able to be moved along said rail in said feed direction, said stand plate having guide sections straddling said rail and engaging over opposite sides thereof, a backlash limiter acting between said stand plate and said guide plate to take up play between the rail and said guide sections while allowing motion of said saw along said rail, said backlash limiter being mounted on said stand plate and comprising an operative part adapted to act against a side face of said rail, said operative part being adapted to move in a direction normal to the direction of the rail and protruding through a gap in the said stand plate and past a face thereof turned toward said rail, and a helical compression spring for urging said operative part, that is in the form of a sliding shoe, against the rail.

2. The guide structure as claimed in claim 1 wherein the said shoe has a range of a adjustment limited by a shoulder thereon, said shoulder coming to rest on the two sides against an edge of the gap.

3. A guide structure for a portable power saw comprising a guide plate adapted to be laid on a piece of work to be sawed with said saw, a proud rail forming part of said guide plate and running in a feed direction of said saw, a stand plate mounted on said saw, said stand plate being adapted to fit onto said guide plate and being able to be moved along said rail in said feed direction, said stand plate having guide sections straddling said rail and engaging over opposite sides thereof, a backlash limiter acting between said stand plate and said guide plate to take up play between the rail and said guide sections while allowing motion of said saw along said rail, said backlash limiter being mounted on said stand plate and comprising an operative part adapted to act against a side face of said rail, said operative part being adapted to move in a direction normal to the direction of the rail and protruding through a gap in the said stand plate and past a face thereof turned toward said rail, and said operative part comprising a ring formed of a springy material acting against the rail.

4. A guide structure for a portable power saw comprising a guide plate adpated to be laid on a piece of work to be sawed with said saw, a proud rail forming part of said guide plate and running in a feed direction of said saw, a stand plate mounted on said saw, said stand plate being adapted to fit onto said guide plate and being able to be moved along said rail in said feed direction, said stand plate having guide sections straddling said rail and engaging over opposite sides thereof, a backlash limiter acting between said stand plate and said guide plate to take up play between the rail and said guide sections while allowing motion of said saw along said rail, said backlash limiter being mounted on said stand plate and comprising an operative part adapted to act against a side face of said rail, said operative part being adapted to move in a direction normal to the direction of the rail and protruding through a gap in the said stand plate and past a face thereof turned toward said rail, said operative part comprising a slide shoe mounted for movement in a direction normal to the direction of said rail and protruding through said gap in said stand plate and past a face thereof turned toward said rail, and screw means threadably engaged between said stand plate and said sliding shoe for moving said sliding shoe into and out of said gap with rotation of said screw means.

5. The guide structure as claimed in claim 4, wherein said shoe has a range of an adjustment limited by a shoulder thereon, said shoulder coming to rest on the two sides against an edge of the gap.

6. The guide structure as claimed in claim 5 wherein said operative part is adapted to act resiliently on said rail.

7. A guide structure for a portable power saw comprising a guide plate adapted to be laid on a piece of work to be sawn with said saw, a raised rail connected to said guide plate and extending in a feed direction of said saw, a stand plate mounted on said saw, said stand plate being adapted to fit onto said guide plate and being able to be moved along said rail in said feed direction, said stand plate having guide sections straddling said rail and engaging over opposite sides thereof, a backlash limiter acting between said stand plate and said guide plate to take up play between said rail and said guide sections, while allowing motion of said saw along said rail, said backlash limiter comprising an adjustable operative part engaged between the guide sections and the rail and acting on a side of the rail, said operative part being movable with respect to said stand plate for engaging said side of said rail, one of said guide sections of said stand plate including an opening therein, said operative part extending through said opening into engagement with said rail, said backlash limiter being mounted on said stand plate.

* * * * *